US008489713B2

(12) United States Patent
Kuo et al.

(10) Patent No.: US 8,489,713 B2
(45) Date of Patent: Jul. 16, 2013

(54) CABLE MODEM AND MULTIMEDIA TERMINAL ADAPTER PARAMETER CONFIGURATION FILE CONFIGURING METHOD

(75) Inventors: Tien-Ting Kuo, Taipei Hsien (TW); Huai-Chih Fan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 319 days.

(21) Appl. No.: 12/914,960

(22) Filed: Oct. 28, 2010

(65) Prior Publication Data

US 2011/0191451 A1 Aug. 4, 2011

(30) Foreign Application Priority Data

Jan. 29, 2010 (CN) .......................... 2010 1 0300930

(51) Int. Cl.
*G06F 15/177* (2006.01)
(52) U.S. Cl.
USPC .......... 709/220; 709/221; 709/222; 709/223; 709/231
(58) Field of Classification Search
USPC ............... 709/203, 220–225, 231; 370/254, 370/352, 485
See application file for complete search history.

(56) References Cited

U.S. PATENT DOCUMENTS

| | | | | |
|---|---|---|---|---|
| 6,295,556 B1 * | 9/2001 | Falcon et al. | | 709/220 |
| 6,493,751 B1 * | 12/2002 | Tate et al. | | 709/221 |
| 6,615,257 B2 * | 9/2003 | Lee et al. | | 709/222 |
| 7,305,460 B2 * | 12/2007 | Park | | 709/222 |
| 7,412,516 B1 * | 8/2008 | Brown et al. | | 709/224 |
| 7,881,225 B2 * | 2/2011 | Siripunkaw et al. | | 370/254 |
| 2002/0007407 A1 * | 1/2002 | Klein | | 709/225 |
| 2002/0073185 A1 * | 6/2002 | Lee et al. | | 709/222 |
| 2004/0090968 A1 | 5/2004 | Kimber et al. | | |
| 2004/0128693 A1 * | 7/2004 | Weigand | | 725/104 |
| 2007/0177526 A1 * | 8/2007 | Siripunkaw et al. | | 370/254 |
| 2008/0037520 A1 * | 2/2008 | Stein et al. | | 370/352 |
| 2008/0140851 A1 * | 6/2008 | Weigand et al. | | 709/231 |
| 2009/0182848 A1 * | 7/2009 | Brown et al. | | 709/220 |
| 2009/0198804 A1 * | 8/2009 | Danforth et al. | | 709/221 |
| 2010/0046729 A1 * | 2/2010 | Bifano et al. | | 379/201.12 |
| 2010/0299338 A1 * | 11/2010 | Aarni et al. | | 707/759 |

FOREIGN PATENT DOCUMENTS

TW I282226 6/2007

* cited by examiner

*Primary Examiner* — Ramy M Osman
(74) *Attorney, Agent, or Firm* — Altis Law Group, Inc.

(57) ABSTRACT

A cable modem stores an original public Internet protocol (IP) address of the cable modem in an original country, and a mapping relationship among a plurality of country codes, a plurality of public IP address ranges, and a plurality of multimedia terminal adapter (MTA) parameter configuration files. The cable modem obtains a new public IP address of a current country in which the cable modem is located. The cable modem determines whether the new public IP address and the original public IP address belong to one of the plurality of public IP address ranges. The cable modem selects one of the plurality of MTA parameter configuration files to configure the cable modem according to the mapping relationship if the new public IP address and the original public IP address belong to different public IP address ranges.

12 Claims, 4 Drawing Sheets

| Country | Public IP Address Range | Country Code | Multimedia Terminal Adapter Parameter Configure Files (such as frequency, cadence etc) |
|---------|-------------------------|--------------|----------------------------------------------------------------------------------------|
| USA | 198.000.000.000~198.255.255.000 | 1 | 600 Hz, 0.5S on 0.5S off |
| China | 192.188.170.000~192.188.170.255 | 86 | 450 Hz, 0.35S on 0.35S off |
| . . . | . . . | . . . | . . . |

FIG. 3

CABLE MODEM AND MULTIMEDIA TERMINAL ADAPTER PARAMETER CONFIGURATION FILE CONFIGURING METHOD

BACKGROUND

1. Technical Field

Embodiments of the present disclosure relate to network communication devices, and more particularly to a cable modem and a multimedia terminal adapter (MTA) parameter configuration file configuring method.

2. Description of Related Art

Each cable modem in a country has a multimedia terminal adapter (MTA) parameter configuration file corresponding to the country in order to make sure a voice over Internet protocol (VoIP) call could be made. Different countries have different country codes, which correspond to different MTA parameter configuration files. If the cable modem is transported from a first country to a second country, quality of calling on phone via the cable modem is sharply decreased because the MTA parameter configuration file in the first country is different from that in the second country.

However, the MTA parameter configuration files of prior cable modems should be manually configured to meet the requirements of the second country in order to improve the calling quality if the cable modem is transported from the first country to the second country. It is prone to make mistake in manually configuring the MTA parameter configuration file. Therefore, it is a large challenge to provide a method to automatically configure the cable modem with the MTA parameter configuration file.

BRIEF DESCRIPTION OF THE DRAWINGS

The details of the disclosure, both as to its structure and operation, can best be understood by referring to the accompanying drawings, in which like reference numbers and designations refer to like elements.

FIG. 3 is a mapping relationship among a public IP address range, a country code, and a multimedia terminal adapter (MTA) parameter configuration file which are stored in the cable modem of FIG. 2.

DETAILED DESCRIPTION

All of the processes described may be embodied in, and fully automated via, software code modules executed by one or more general purpose computers or processors. The code modules may be recorded in any type of computer-readable medium or other storage device. Some or all of the methods may alternatively be embodied in specialized computer hardware or communication apparatus.

Figure 1:
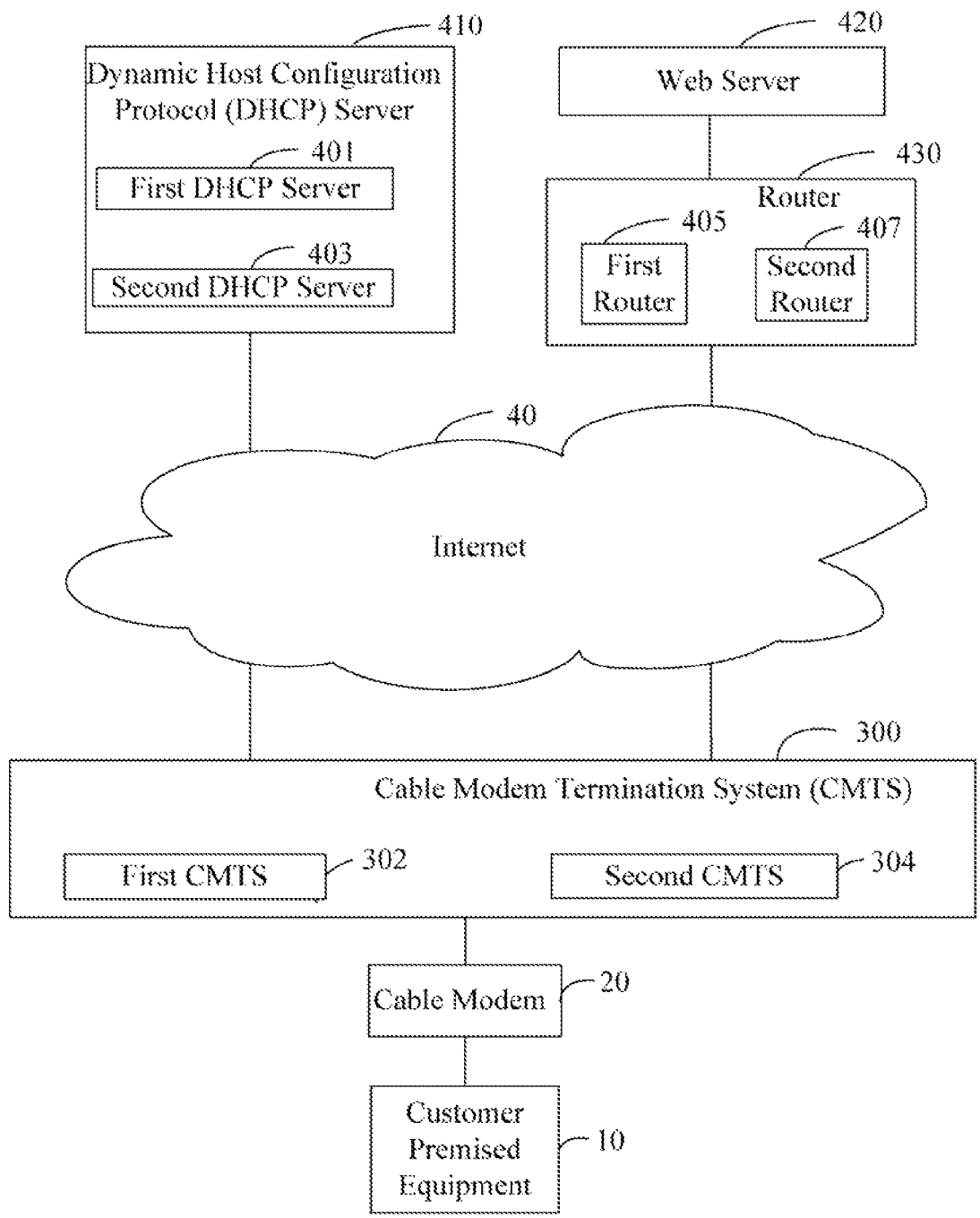
FIG. 1 is a schematic diagram of an application environment of one embodiment of a cable modem of the present disclosure.

FIG. 1 is a schematic diagram of an application environment of one embodiment of a cable modem 20 of the present disclosure. In one embodiment, the cable modem 20 connects a customer premised equipment (CPE) 10 to a cable modem termination system (CMTS) 300, and connects to the Internet 40 via the cable modem termination system 300 to allow the CPE 10 to access to the Internet 40. In one embodiment, the CPE 10 may be, for example, a personal computer.

In the embodiment, when the cable modem 20 is located in different countries, the cable modem 20 accesses the Internet 40 by using different CMTS 300, such as a first CMTS 302 in one country, or a second CMTS 304 in another country. There are at least a dynamic host configuration protocol (DHCP) server 410 connects to the Internet 40, and at least one web server 420 and at least a router 430 connect to the Internet 40. In one embodiment, the DHCP server 410 comprises a first DHCP server 401 and a second DHCP server 403 which are distributed in different countries, and the router 430 comprises a first router 405 and a second router 407 which are distributed in different countries. In the embodiment, the at least one web server 420 provides web service with Hypertext Transfer Protocol (HTTP), such as http://www.yahoo.com, or http://www.sina.com.cn.

Then, the cable modem 20 communicates with the first DHCP server 401 via the first CMTS 302 when the cable modem 20 is located in the one country. If the cable modem 20 is transported from the one country to the another country, the cable modem 20 communicates with the second DHCP server 403 via the second CMTS 304.

In one embodiment, the first DHCP server 401 and the second DHCP server 403 are both configured for assigning public Internet protocol (IP) addresses for the cable modem 20 located in different locations or countries, respectively.

In another embodiment, if the cable modem 20 has not been obtained public IP address from the DHCP server 410, the cable modem 20 accesses to the web server 420 to obtain public IP address. The cable modem 20 accesses to the web server 420 via the first CMTS 302 and the first router 405 when the cable modem 20 is located in an original country. The cable modem 20 accesses to the web server 420 via the second CMTS 304 and the second router 407 when the cable modem 20 is transported from the original country to a current country.

As mentioned earlier, different countries have different country codes, which correspond to different multimedia terminal adapter (MTA) parameter configuration file. When the cable modem 20 is moved to a different country from where it was originally designated for, cable modem 20 automatically selects corresponding MTA parameter configuration files to the country code of the new country. The CPE 10 connected to the cable modem 20 can surf the Internet 40 by use of the cable modem 20.

Figure 2:
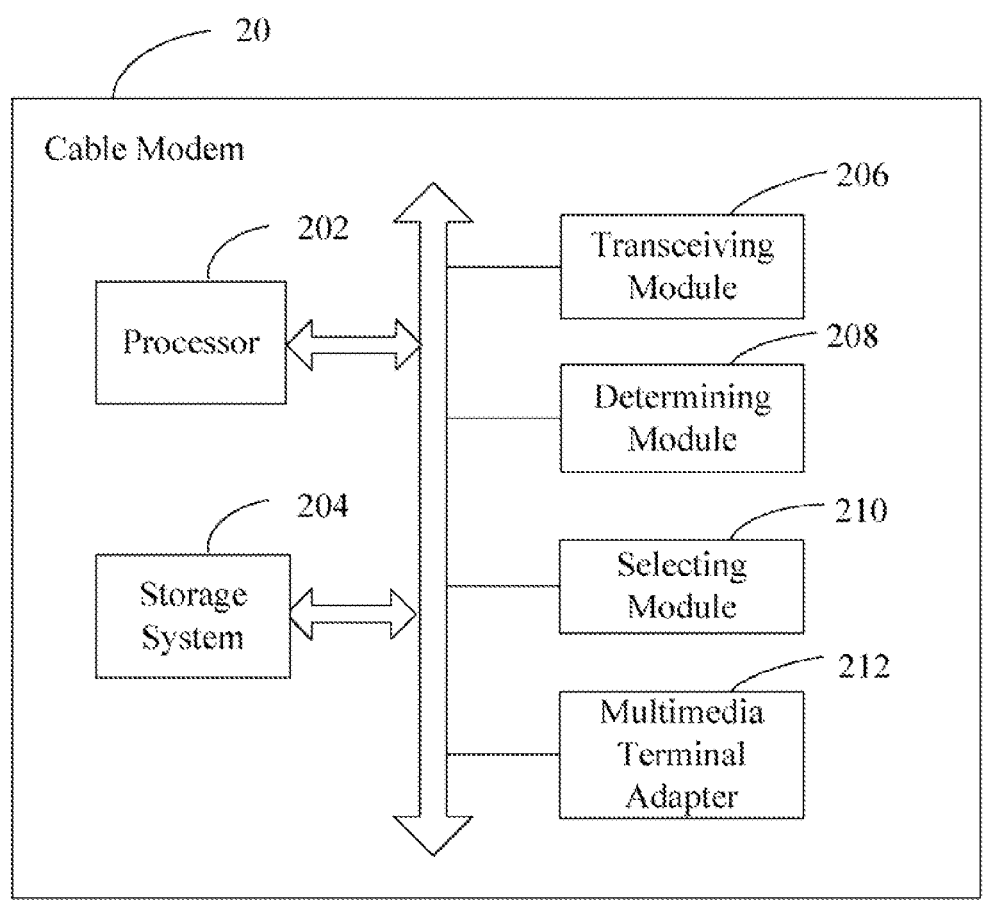
FIG. 2 is a schematic diagram of functional modules of one embodiment of the cable modem of FIG. 1.

FIG. 2 is a schematic diagram of functional modules of one embodiment of the cable modem 20 of FIG. 1. As shown, the cable modem 20 comprises at least one processor 202, a storage system 204, a transceiving module 206, a determining module 208, a selecting module 210, and a MTA 212. The modules 206-212 may comprise computerized codes in the form of one or more programs that are stored in the storage system 204. The computerized code comprises instructions that are executed by the at least one processor 202 to provide functions of the modules 206-212.

The storage system 204 stores an original public Internet protocol (IP) address of the original country in which the cable modem 20 is originally located. In one embodiment, the transceiving module 206 broadcasts DHCP request packets to the first DHCP server 401 via the first CMTS 302 in order to obtain the original public IP address when the cable modem 20 is located in the original country. The first DHCP server 401 distributes the original public IP address of the original country to the cable modem 20 upon receiving the DHCP request packets.

The storage system 204 further stores a mapping relationship of countries, public IP address ranges corresponding to the countries, country codes of the countries, and MTA parameter configuration files employed by corresponding countries. FIG. 3 shows such an exemplary mapping relationship. As shown in FIG. 3, one country code is corresponding to one public IP address range and one MTA parameter configuration file. In one embodiment, each MTA parameter configuration file defines a plurality of configuration parameters of the cable modem 20, such as ringing, tone, frequency, on-hook timer, off-hook timer, cadence, etc.

For example, the country code of United States of America is 1, and the country code of China is 86. A frequency of the MTA parameter configuration file in United States of America is 600 Hz, and a frequency of the MTA parameter configuration file in China is 450 Hz. A public IP address range in United States of America is 198.000.000.000~198.255.255.000, and a public IP address range in China is 192.188.170.000~192.188.170.255.

The transceiving module 206 transmits the DHCP request packets to the DHCP server 410 via the CMTS 300 in order to obtain a new public IP address from the DHCP server 410 when the cable modem 20 boots up.

If the cable modem 20 is not transported from the original country to another country, the DHCP server 410 and the CMTS 300 are the first DHCP server 401 and the first CMTS 302, respectively.

If the cable modem 20 is transported from the original country to the current country, the DHCP server 410 and the CMTS 300 are the second DHCP server 403 and the second CMTS 304, respectively.

The transceiving module 206 determines whether the new public IP address has been successfully obtained from the DHCP server 410.

In one embodiment, the DHCP server 410 distributes the new public IP address that depends on whether the DHCP server 410 has run out of public IP addresses or not. If the DHCP server 410 has not run out of public IP address, the DHCP server 410 would distribute the new public IP address to the cable modem 20. On contrary, if the DHCP server 410 has run out of public IP addresses, the DHCP server 410 would not distribute the new public IP address to the cable modem 20.

The transceiving module 206 transmits Internet control message protocol (ICMP) packets to the web server 420 if the new public IP address has not been obtained from the DHCP server 410. In one embodiment, the ICMP packets transmitted by the transceiving module 206 may through the CMTS 300 and at least the router 430 to reach the web server 420. If the cable modem 20 is not transported from the original country to another country, the CMTS 300 and the router 430 are the first CMTS 302 and the first router 405, respectively. On contrary, if the cable modem 20 is transported from the original country to the current country, the CMTS 300 and the router 430 are the second CMTS 304 and the second router 407, respectively.

Generally, the cable modem 20 needs to obtain the new public IP address in order to access the Internet 40.

In one embodiment, the cable modem 20 has two ways to obtain the new public IP address to access the Internet 40.

In the first way, the transceiving module 206 transmits the DHCP request packets to the DHCP server 410 directly to obtain the new public IP address. Although quick, there is a chance of failure with the first way if the DHCP server 410 has run out of public IP addresses.

In the second way, the transceiving module 206 obtains the new public IP address from the router 430 or the web server 420 by way of tracerouter, that is, the transceiving module 206 transmits Internet control message protocol (ICMP) packets to the web server 420 via at least the router 430, and receives a plurality of responding packets from the web server 420 and at least the router 430. In one embodiment, the ICMP packets transmitted by the transceiving module 206 may through at least the router 430 to reach the web server 420. One of the plurality of responding packet received from the router 430 comprises a public IP address which the router 430 used by itself, and one of the plurality of the responding packet received from the web server 420 comprises another public IP address which the web server 420 used by itself. Therefore, the transceiving module 206 obtains the new public IP address which the router 430 used by itself or the web server 420 used by itself by way of tracerouter.

In one embodiment, the transceiving module 206 obtains the new public IP address from one of the responding packets which is firstly received.

The determining module 208 determines a public IP address range the new public IP address belongs to on the condition that the new public IP address has been obtained from the DHCP server 410 or from the router 430 or the web server 420 by way of tracerouter. In one embodiment, the determining module 208 determines the public IP address range that the new public IP address belongs to according to the mapping relationship stored in the storage system 204.

The determining module 208 determines if the new public IP address and the original public IP address belong to same one public IP address range according to the mapping relationship stored in the storage system 204, in order to determine whether the cable modem 20 is transported from the original country to another country.

In one embodiment, the new public IP address and the original public IP address belong to same one public IP address range indicates the cable modem 20 is not transported from the original country to another country. On contrary, the new public IP address and the original public IP address belong to different public IP address ranges indicates the cable modem 20 is transported from the original country to the current country.

The selecting module 210 selects a country code corresponding to the new public IP address according to the mapping relationship stored in the storage system 204 if the new public IP address and the original public IP address belong to different public IP address ranges. In one embodiment, the selecting module 210 replaces the original public IP address in the storage system 204 with the new public IP address firstly if the new public IP address and the original public IP address belong to different public IP address range, the selecting module 210 selects the country code corresponding to the new public IP address according to the mapping relationship secondly.

The selecting module 210 further selects one of the plurality of MTA parameter configuration files according to the selected country code according to the mapping relationship in FIG. 3.

The selecting module 210 configures the cable modem 20 with the selected one of the plurality of MTA parameter configuration files.

Therefore, the cable modem 20 of the present disclosure automatically configures the cable modem 20 with the MTA parameter configuration file corresponding to the country in which the cable modem 20 located, which improve the quality of calling if the cable modem 20 is transported from the original country to another country.

Figure 4:
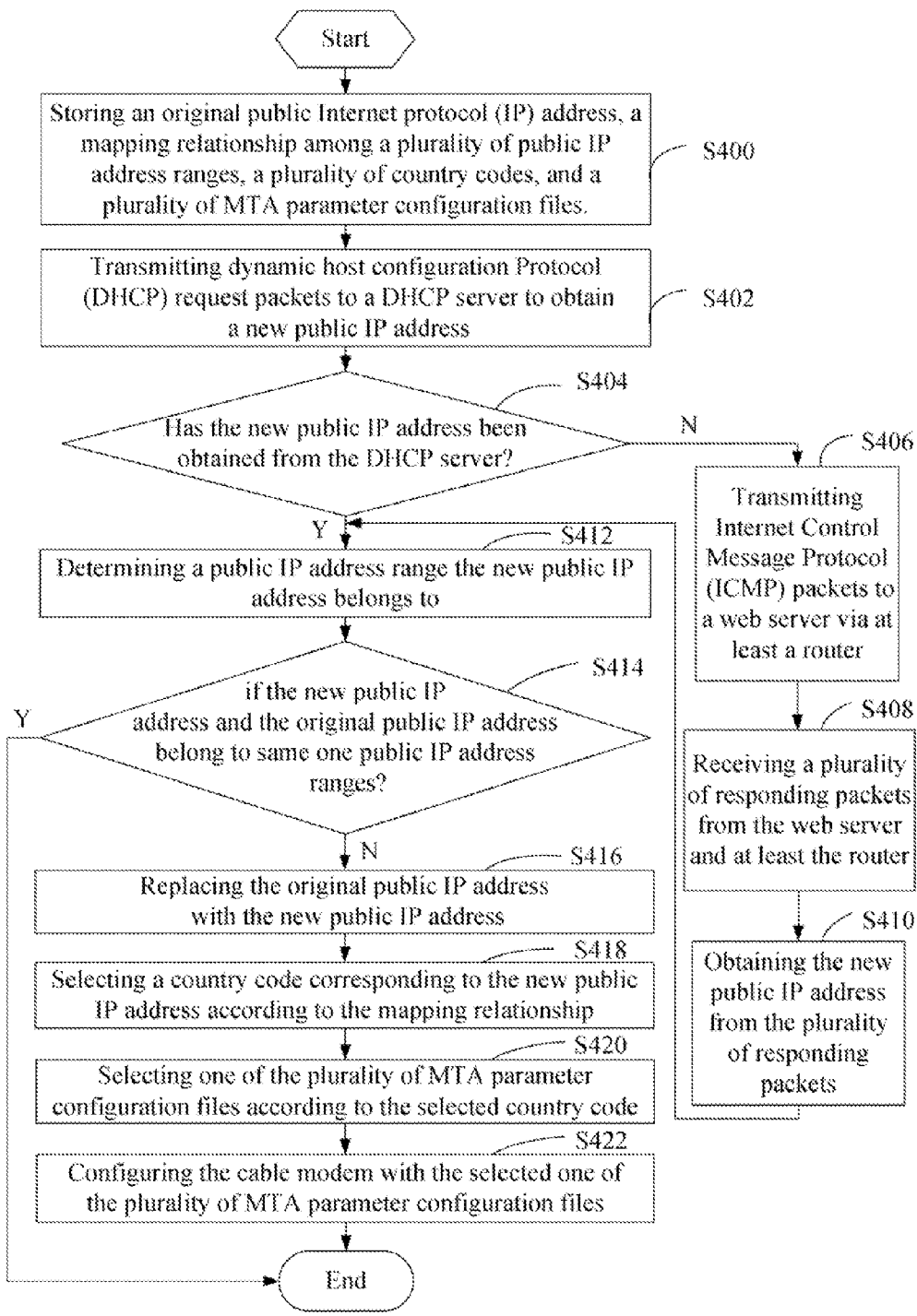
FIG. 4 is a flowchart of a MTA parameter configuration file configuring method of one embodiment of the present disclosure.

FIG. 4 is a flowchart of a MTA parameter configuration file configuring method of one embodiment of the present disclosure. The flowchart is executed by the modules of FIG. 2. Depending on the embodiment, additional blocks may be added, others deleted, and the ordering of blocks may be changed while remaining well within the scope of the disclosure.

In block S400, the storage system 204 stores the original public IP address of the original country in which the cable modem 20 is originally located, and the mapping relationship of countries, public IP address ranges corresponding to the countries, country codes of the countries, and MTA parameter configuration files employed by corresponding countries.

In block S402, the transceiving module 206 transmits the DHCP request packets to the DHCP server 410 via the CMTS 300 in order to obtain the new public IP address from the DHCP server 410 when the cable modem 20 boots up.

If the cable modem 20 is not transported from the original country to another country, the DHCP server 410 and the CMTS 300 are the first DHCP server 401 and the first CMTS 302, respectively.

If the cable modem 20 is transported from the original country to a current country, the DHCP server 410 and the CMTS 300 are the second DHCP server 403 and the second CMTS 304, respectively.

In block S404, the transceiving module 206 determines whether the new public IP address has been obtained from the DHCP server 410.

In one embodiment, the DHCP server 410 distributes the new public IP address that depends on whether the DHCP server 410 has run out of public IP addresses or not. If the DHCP server 410 has not run out of public IP address, the DHCP server 410 would distribute the new public IP address to the cable modem 20. On contrary, if the DHCP server 410 has run out of public IP addresses, the DHCP server 410 would not distribute the new public IP address to the cable modem 20.

In block S406, the transceiving module 206 transmits ICMP packets to the web server 420 via at least the router 430 if the new public IP address has not been obtained from the DHCP server 410. In one embodiment, the ICMP packets transmitted by the transceiving module 206 may through the CMTS 300 and at least the router 430 to reach the web server 420. If the cable modem 20 is not transported from the original country to another country, the CMTS 300 and the router 430 are the first CMTS 302 and the first router 405, respectively. On contrary, if the cable modem 20 is transported from the original country to the current country, the CMTS 300 and the router 430 are the second CMTS 304 and the second router 407, respectively.

In one embodiment, the cable modem 20 has two ways to obtain the new public IP address to access the Internet 40.

In the first way, the transceiving module 206 transmits the DHCP request packets to the DHCP server 410 directly to obtain the new public IP address. Although quick, there is a chance of failure with the first way if the DHCP server 410 has run out of public IP addresses.

In the second way, the transceiving module 206 obtains the new public IP address from the router 430 or the web server 420 by way of tracerouter, that is, the transceiving module 206 transmits Internet control message protocol (ICMP) packets to the web server 420 via at least the router 430, and receives a plurality of responding packets from the web server 420 and at least the router 430, show as in block S408.

In block S408, the transceiving module 206 receives the plurality of responding packets from the web server 420 and at least the router 430. In one embodiment, the ICMP packets transmitted by the transceiving module 206 may through at least the router 430 to reach the web server 420. One of the plurality of responding packet received from the router 430 comprises a public IP address which the router 430 used by itself, and one of the plurality of the responding packet received from the web server 420 comprises another public IP address which the web server 420 used by itself. Therefore, the transceiving module 206 obtains the new public IP address which the router 430 used by itself or the web server 420 used by itself by way of tracerouter.

In block S410, the transceiving module 206 obtains the new public IP address from the plurality of responding packets. In one embodiment, the transceiving module 206 obtains the new public IP address from one of the responding packets which is firstly received.

If the new public IP address has been obtained from the DHCP server 410 or from one of the responding packets which is firstly received, in block S412, the determining module 208 determines the public IP address range that the new public IP address belongs to according to the mapping relationship stored in the storage system 204.

In block S414, the determining module 208 determines if the new public IP address and the original public IP address belong to same one public IP address range according to the mapping relationship stored in the storage system 204, in order to determine whether the cable modem 20 is transported from the original country to another country.

In one embodiment, the new public IP address and the original public IP address belong to same one public IP address range indicates the cable modem 20 is not transported from the original country to another country, that is, the cable modem 20 is still in the original country. On contrary, the new public IP address and the original public IP address belong to different public IP address ranges indicates the cable modem 20 is transported from the original country to the current country.

If the new public IP address and the original public IP address belong to different public IP address ranges, in block S416, the selecting module 210 replaces the original public IP address in the storage system 204 with the new public IP address.

In block S418, the selecting module 210 selects the country code corresponding to the new public IP address according to the mapping relationship stored in the storage system 204.

In block S420, the selecting module 210 further selects one of the plurality of MTA parameter configuration files according to the selected country code according to the mapping relationship in FIG. 3.

In block S422, the selecting module 210 configures the cable modem 20 with the selected one of the plurality of MTA parameter configuration files.

Therefore, the cable modem 20 of the present disclosure automatically configures the cable modem 20 with the MTA parameter configuration file corresponding to the country in which the cable modem 20 is located, which improve the quality of calling if the cable modem 20 is transported from the original country to the current country.

While various embodiments and methods of the present disclosure have been described, it should be understood that they have been presented by example only and not by limitation. Thus the breadth and scope of the present disclosure should not be limited by the above-described embodiments, but should be defined only in accordance with the following claims and their equivalents.

What is claimed is:

1. A cable modem, comprising:
   at least one processor; and
   a storage system operable to store an original public Internet protocol (IP) address of the cable modem in an original country, a mapping relationship among a plurality of country codes, a plurality of public IP address ranges, and a plurality of multimedia terminal adapter (MTA) parameter configuration files, and one or more modules stored in the storage system and configured for execution by the at least one processor, the one or more modules comprising instructions:
  to obtain a new public IP address of a current country in which the cable modem is located;
  to determine a public IP address range that the new public IP address belong to, the determine according to the mapping relationship stored in the storage system;
  to determine whether the new public IP address and the original public IP address belong to same one public IP address range according to the mapping relationship stored in the storage system;
  to replace the original public IP address in the storage system with the new public IP address and select a country code corresponding to the new public IP address according to the mapping relationship stored in the storage system if the new public IP address and the original public IP address belong to different public IP address ranges;
  to select one of the plurality of MTA parameter configuration files according to the selected country code; and
  to configure the cable modem with the selected one of the plurality of MTA parameter configuration files.

2. The cable modem as claimed in claim 1, wherein the one or more modules to obtain the new public IP address further comprising instructions:
  to transmit dynamic host configuration protocol (DHCP) request packets to a DHCP server in the current country to obtain the new public IP address from the DHCP server.

3. The cable modem as claimed in claim 2, wherein the original public IP address is obtained from the DHCP server when the cable modem boots up at a first time in the original country.

4. The cable modem as claimed in claim 3, wherein the one or more modules further comprising instructions:
  to determine whether the new public IP address has been successfully obtained from the DHCP server; and
  to transmit Internet control message protocol (ICMP) packets to a web server via at least a router to obtain the new public IP address if the new public IP address has not been obtained from the DHCP server.

5. The cable modem as claimed in claim 4, wherein the one or more modules further comprising instructions:
  to receive a plurality of responding packets from the web server and at least the router; and
  to obtain the new public IP address from the plurality of responding packets.

6. The cable modem as claimed in claim 5, wherein the one or more modules further comprising instructions:
  to obtain the new public IP address from firstly received one of the plurality of responding packets.

7. A multimedia terminal adapter (MTA) parameter configuration file configuring method of a cable modem, comprising:
  storing an original public Internet protocol (IP) address of the cable modem in an original country, a mapping relationship among a plurality of country codes, a plurality of public IP address ranges, and a plurality of MTA parameter configuration files;
  obtaining a new public IP address of a current country in which the cable modem is located;
  determining a public IP address range that the new public IP address belongs to, the determining according to the mapping relationship;
  determining whether the new public IP address and the original public IP address belong to same one public IP address range according to the mapping relationship;
  replacing the original public IP address with the new public IP address and selecting a country code corresponding to the new public IP address according to the mapping relationship stored in the storage system if the new public IP address and the original public IP address belong to different public IP address ranges;
  selecting one of the plurality of MTA parameter configuration files according to the selected country code; and
  configuring the cable modem with the selected one of the plurality of MTA parameter configuration files.

8. The MTA parameter configuration file configuring method as claimed in claim 7, further comprising:
  transmitting dynamic host configuration protocol (DHCP) request packets to a DHCP server in the current country to obtain the new public IP address from the DHCP server.

9. The MTA parameter configuration file configuring method as claimed in claim 8, wherein the original public IP address is obtained from the DHCP server when the cable modem boots up at a first time in the original country.

10. The MTA parameter configuration file configuring method as claimed in claim 9, further comprising:
  determining whether the new public IP address has been successfully obtained from the DHCP server; and
  transmitting Internet control message protocol (ICMP) packets to a web server via at least a router to obtain the new public IP address if the new public IP address has not been obtained from the DHCP server.

11. The MTA parameter configuration file configuring method as claimed in claim 10, further comprising:
  receiving a plurality of responding packets from the web server and at least the router; and
  obtaining the new public IP address from the plurality of responding packets.

12. The MTA parameter configuration file configuring method as claimed in claim 11, further comprising:
  obtaining the new public IP address from firstly received one of the plurality of responding packets.

* * * * *